US006004649A

United States Patent [19]

Nagata

[11] Patent Number: 6,004,649

[45] Date of Patent: Dec. 21, 1999

[54] WOVEN SHEET WITH ONE-WAY VIEWING

[76] Inventor: Masao Nagata, 1402-10, Oaza-Shimokurubara, Kanagi-machi, Naka-gun, Shimane, Japan, 697-01

[21] Appl. No.: 08/688,527

[22] Filed: Jul. 30, 1996

[51] Int. Cl.[6] .................... B32B 3/24

[52] U.S. Cl. .................... 428/107; 428/542.6; 428/913.3; 442/43

[58] Field of Search .................... 428/107, 542.6, 428/913.3, 927; 442/43; 283/56; 40/602, 603, 604, 559, 584

[56] References Cited

U.S. PATENT DOCUMENTS

| | | | |
|---|---|---|---|
| 243,962 | 7/1881 | Palmer | 442/43 |
| 2,779,117 | 1/1957 | Russo | 40/128 |
| 4,673,609 | 6/1987 | Hill . | |
| 5,177,890 | 1/1993 | Hisatomi et al. | 40/447 |
| 5,307,578 | 5/1994 | Fichtenau | 40/584 |
| 5,609,938 | 3/1997 | Shields . | |
| 5,679,435 | 10/1997 | Andriash . | |

*Primary Examiner*—Deborah Jones
*Assistant Examiner*—Jason Savage
*Attorney, Agent, or Firm*—Armstrong, Westerman, Hattori, McLeland & Naughton

[57] ABSTRACT

A sheet comprising a net-like structure, being coated with a dark paint on the rear surface side, and being provided with a description including characters, pictures or the like on the front surface side.

8 Claims, 3 Drawing Sheets

FIG. 1
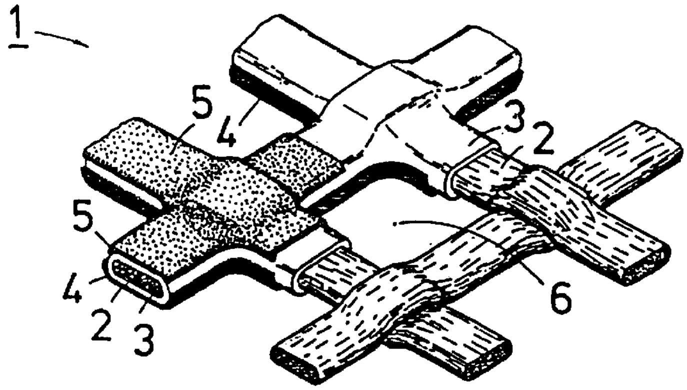
FIG. 2a
FIG. 2b
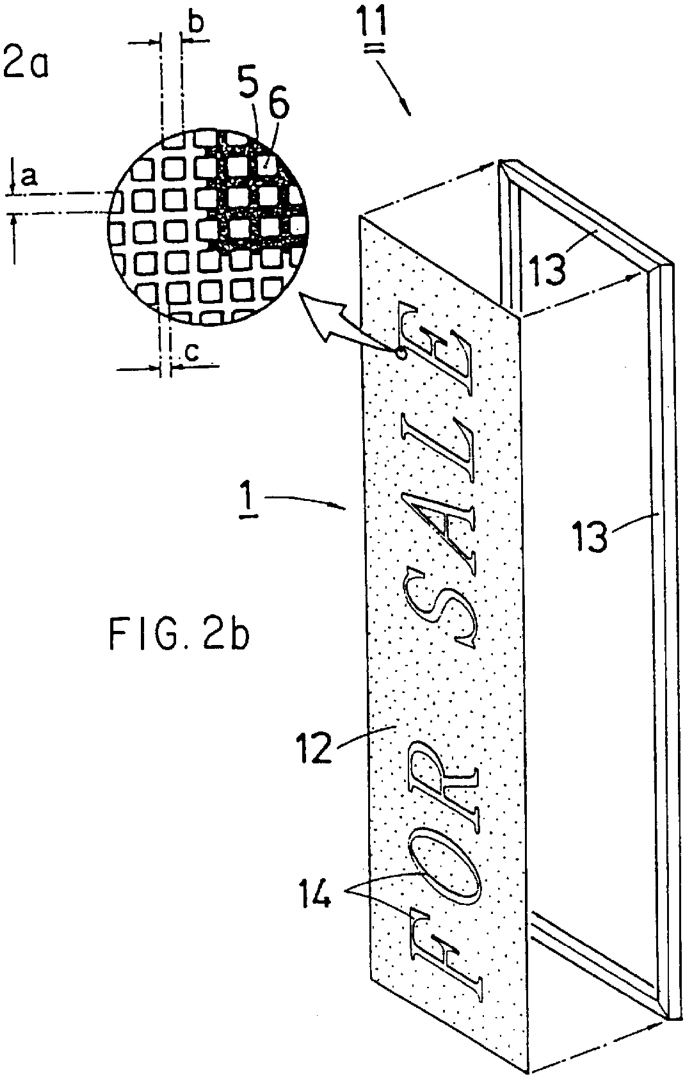

WOVEN SHEET WITH ONE-WAY VIEWING

BACKGROUND OF THE INVENTION

1. Field of the Invention

The present invention relates to a structure of a sheet, or of a broad thin piece of material in the form of a sheet which is air-permeable and through which anything is substantially not seen at a front or rear side of the sheet.

2. Prior Art

Advertising material is often provided directly on buildings themselves. For example, at department stores or large-scale store buildings an advertising banner is used as an advertisement media to be suspended from the roof onto the outer wall, which is cheaper to install and has excellent workability in removal and replacement, among various types of advertisement provided in the similar manner, such as advertising balloons, large signboards, electric bulletin boards, special painting on the outer wall of buildings, or the like.

The advertising material in the form of a sheet is generally set outside the buildings and has a defect as likely affected by winds. The banner suspended from the building roof onto the outer wall may be gotten turned up or twisted even by a gentle wind, whereby advertisement provided or shown on the banner is put out of sight and ropes tightening the banner are disconnected or torn off, occasionally causing serious accidents.

The sheet material is used also for various portable tents for changing clothes, showering or getting sunshade on the beach or the like crowded with many people. The sheet material used for the tents is generally not of air-permeability and users feel uncomfortable in the tent. An opening which may be provided for ventilation in the tent will be closed when users change clothes, resulting in the change of clothes under a poor or uncomfortable circumstance.

The material in the form of a sheet, such as fabric for the above advertising banner and the tents, or others, when used to divide a space, does not at all provide sight through the material. For example, the advertising banner, when suspended from the roof onto the outer wall as covering any windows of the building, hinders any views from being afforded through the windows. Similarly, the foregoing tents even when set up at a location with a fine view do not allow users to enjoy the view from the inside of the tents while simultaneously preventing people outside the tent from looking inside.

SUMMARY OF THE INVENTION

Under the above circumstances the inventor zealously studied and achieved the sheet of the present invention which includes netting and is provided on the rear side with a dark color paint and on the front side with indication by characters, pictures or the like.

BRIEF DESCRIPTION OF THE DRAWINGS

FIG. 1 is a partially exploded explanatory view showing a structure in an example of the sheet according to the present invention.

FIG. 2 is a perspective view showing an example of a product using the sheet according to the present invention.

DETAILED DESCRIPTION OF THE INVENTION

Figure 3A:
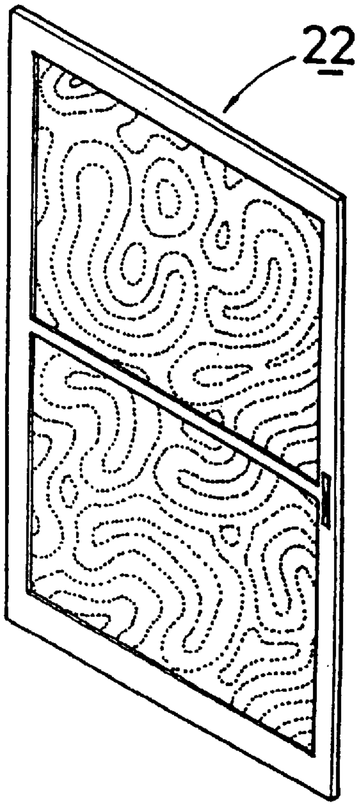
FIGS. 3(*a*),(*b*),(*c*),(*d*) and (*e*) are perspective views illustrating other examples of products using the the sheet according to the present invention.

To solve the aforesaid problems, the inventor first made a member in the form of a sheet which member comprises a net-like structure having a number of small apertures, and noticed that winds blowing against the sheet member partially pass through the sheet member, thereby causing wind pressure on the sheet member to be reduced. And it was found that the sheet material having a number of small apertures, when applied as the banner suspended from a building's roof onto the outer wall as covering windows of the building, ensures sight through the windows to some extent. The sight was in fact not so excellent because it was deteriorated by irregular reflection of light on a rear surface of the sheet material (e.g., a surface of the aforesaid advertising banner opposite to its surface having advertisement thereon) or by light passing through the sheet material itself.

To eliminate the defect, the inventor applied a dark paint onto the rear surface of the sheet material, whereby the amount of reflected light was reduced and excellent sight was obtained. As a result, the sheet material is resistive to winds and provides that windows and others behind the sheet material cannot be seen through from the outside of the building while the outside scene is fully viewed from the inside through the windows.

Those are the gist of the present invention.

The sheet is put into practical use in various ways and fully shows its effect with the above structure. The advertising banner is one of use of the sheet. A more effective structure of the sheet as the advertising banner is disclosed here.

Problems peculiar to the advertising banner are as follows. The dark paint applied onto the rear surface of the sheet has to hinder applied light from passing through the paint. Hence, the dark paint is to be applied thick to some extent, whereby the advertising banner becomes most costly to manufacture. In fact, it is only a part of the advertising banner suspended from a building's roof onto the outer wall as covering the building surface at which part the sight from the building's inside (e.g., windows) is to be ensured. In other words, the dark paint applied on the sheet at its part not facing the windows merely increases the cost of the sheet without any benefit. In addition applying thick the paint increases the weight, whereby higher strength is required for a fixing means and ropes for retaining the advertising banner or other application of the sheet material.

Accordingly, the inventor discloses here as an example of the present invention a sheet material to be suspended over a wall surface of a building which comprises a sheet body including a net-like structure and is applied at its rear side partially with a dark paint whichpart of the sheet covers the windows or the like of the building. That is, application of the dark paint which carried out customarily on the whole rear surface of the sheet is limited to a necessary part thereof to achieve making the sheet lightweight and lowering cost to produce.

The "net-like" structure is the state provided with a number of small apertures. Methods for forming the small apertures are not limited to any specific ones and may include such a feature that a plastic sheet is punched to have many holes. The inventor carried out experiments and obtained preferable results in such feature that synthetic or inorganic fiber yarns are woven with yarns adjacent to one another having "certain distances". The "distances" vary depending on thickness of the yarns, use of the sheet, etc. For satisfying the objects of the present invention to ensure air-permeability, obstruct the view from the outside of the sheet and provide sight from the inner side of the sheet, width of the fiber yarns at their flat portions (or diameter of the yarns at round portions thereof) are preferably about 0.5–4.0 mm and apertures of the net defined by the distances between the yarns are about 0.5 –4.0 mm square.

The front and rear surfaces of the sheet are defined by presence and non-presence of any description thereon. A surface of the sheet having a description thereon is called “the front surface”, and an opposite surface called “the rear surface”. The “description” is information which includes characters, figures or symbols, or any combinations of these. In case of a general advertisement, “messages for advertisement” is the description, and in case of a rolling screen, a “picture” drawn thereon is the description. Thus, a plain, unicolor surface is excluded from the “description” referred to above.

The term “dark” of the dark paint applied on the rear surface of the sheet is defined as a color not so stimulative to the optic nerve, and basically a color lower in lightness than average lightness on the front surface (having the “description”). The color is not determined based only on colored or uncolored state, or differences in hues, but the optic nerve tends to be more stimulated by a color higher in surface gloss than others even when the colors are equal in lightness. Hence, a a paint lower in lightness and having no surface gloss is most preferable, such as black, dark blue, or dark gray.

The present invention relates to the structure of the sheet itself and does not limit use of the sheet to any particular size. It is preferable to utilize the sheet according to the present invention in any application enabling use of the characteristic of the invention that the description such as a picture, characters or the like is clearly seen from the side of the sheet having the description thereon while sight is obtained at the rear side through the net structure. For example, when the sheet is used for a standing signboard at a site of road repairing, walkers can be readily seen from the rear side of the signboard. Also, when the sheet is applied as a blind on windows or used for a net of a window screen, the outside of the building can be seen from the inside through the sheet, while the inside is hard to be seen from the outside.

Features for applying the description such as characters, pictures, etc., on the sheet surface are not limited to any. In experiments made by the inventor, applying the paint by printing or spraying was preferable to have less leakage of the paint to the rear side in comparison with brushing.

EMBODIMENTS

Next, the present invention will be detailed with referring to the examples shown in the attached drawings.

FIG. 1 is an explanatory view schematically showing an example of the structure of the sheet 1 according to the present invention. The sheet 1 comprises plain weave fabric (a substrate) including synthetic fiber yarn 2 (illustrated as flat strips for convenience of explanation but actually more cylindrical and deformed to be flat at the intersection). The whole surface of the substrate is coated with a paint 3 (white), and a paint 4 (black) is sprayed on the rear side of the substrate and a paint 5 (multi-color) for the description is applied on the front side by printing.

FIG. 2 shows a standing signboard 11, an example of products using the sheet according to the present invention. The signboard 11 comprises an indication sheet 12 formed with the sheet 1 and four frame members 13 for fixing the indication sheet 12. Characters for advertisement (the description 14) are applied on the surface of indication sheet 12 by spraying a paint. A black paint is previously applied on the rear surface of the indication sheet 12. Net holes (small apertures) 6 are not closed by the paints and are about 1 mm in length and breadth (indicated by a and b in FIG. 2) with the synthetic fiber yarn 2 about 1.3 mm in width (indicated by c), thereby forming the net-like structure. The sizes of the holes 6 of the sheet are not limited to those but may be any sizes that enable the description to be fully recognized and also enable sight at the rear side to be provided through the net holes. In detail, the net holes may be about 0.5–4.0 mm square and width of the synthetic fiber yarns about 0.5–4.0 mm to show sufficient effects.

Figure 3B:
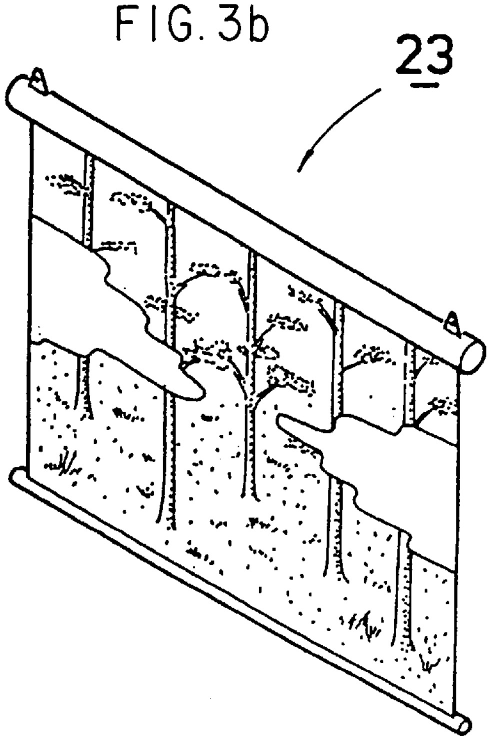
Figure 3C:
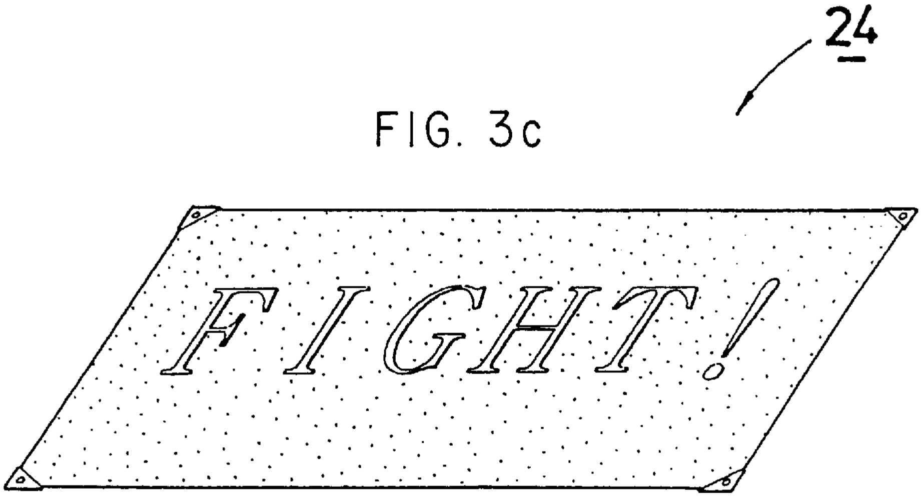
Figure 3D:
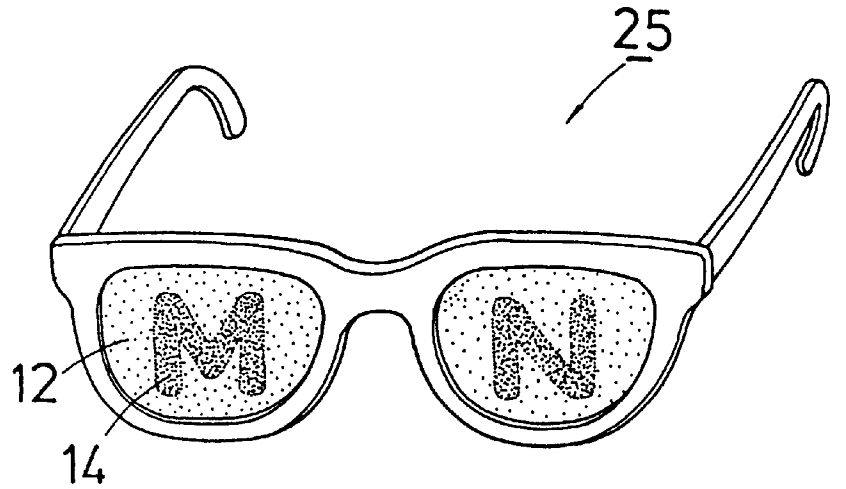
Figure 3E:
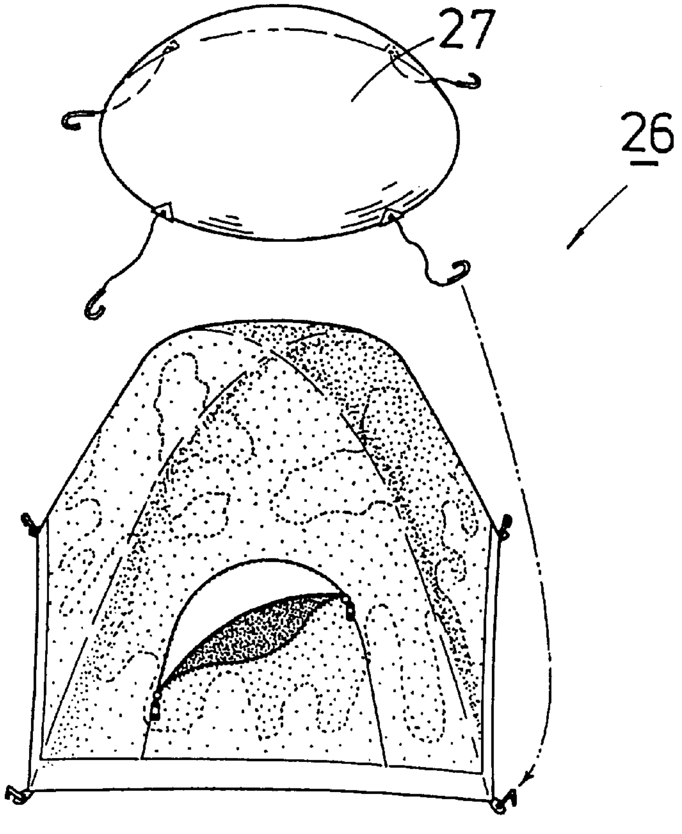

In the example, the synthetic fiber employs polyester filament yarn and is coated with nonflammable paint. Alternatively, other plastic or glass fibers or the like may be used, or a plastic sheet having a number of punched holes may be used without adopting the weaving the fiber yarns. Also, the “description” may be applied on the sheet surface by any methods (not shown) other than printing above. FIGS. 3(*a*),(*b*),(*c*),(*d*) and (*e*) show other examples of products using the sheet 1 according to the present invention, such as a window screen 22, a rolling screen 23, a cheering banner 24, a sunglass 25, a tent 26 (having a body comprising the sheet material according to the present invention and covered with a transparent plastic sheet 27). The invention may be applicable to any various products other than those shown.

EFFECT OF THE INVENTION

As concretely explained above, the sheet according to the present invention is provided in a net-like shape, applied at the rear surface with a dark paint and at the front side with the “description” including characters, pictures or the like. Hence, the invention is quite advanced to have the following effects.

(1) The sheet has the net-like structure to cause winds to partially pass through the net. Hence, the sheet used for the advertising banner or the like is less turned up by winds blowing. Also, since the advertising banner is not likely to be affected by winds, the banner is not required to be firmly retained at a fixed thing such as a building roof or the like, whereby installing and removal the banner are quite simple operations.

(2) In use for a tent, sunshade or the like, the sheet which has the body in the net-like structure provides air-permeability and cause users to feel comfortable.

(3) The sheet has the net-like structure and is coated at the rear side with a dark paint, so that sight from the rear side is excellently obtained, whereby the sheet even when covers windows or the like does less cause uncomfortableness inside the room, and safety is readily watched when the sheet product is arranged on road, etc.

(4) From the front side of the sheet, the “description” on the sheet is seen but the rear side is hard to be viewed, while anything on the front side is readily viewed from the rear side. Hence, the sheet may be effectively used for a blind.

What I claimed is:

1. A mesh comprising:

woven synthetic fiber yarn, wherein the width of the synthetic fiber yarn is in the range of 0.5 to 4.0 millimeters, and wherein holes defined by open spaces between the yarns are in the range of 0.5 to 4.0 millimeters square, said mesh being coated on a rear surface side with a dark paint and being provided on a front surface side with characters, pictures or designs, whereby objects on the front surface side may be viewed from the rear surface side while objects on the rear surface side are substantially not viewable from the front surface side.

2. A mesh as set forth in claim 1, wherein the entire mesh is first covered with a white paint and subsequently the rear surface side is coated with said dark paint and the front surface side is provided with said characters, pictures or designs.

3. A mesh as set forth in claim 1 or 2, wherein the dark paint applied on the rear surface side of the mesh forms a part of the rear surface.

4. A mesh comprising:

woven synthetic fiber yarn, wherein the width of the synthetic fiber yarn is in the range of 1.0 to 1.5 millimeters, and wherein holes defined by open spaces between the yarns are in the range of 0.5 to 1.0 millimeters square, said mesh being coated on a rear surface side with a dark paint and being provided on a front surface side with characters, pictures or designs, whereby objects on the front surface side may be viewed from the rear surface side while objects on the rear surface side are substantially not viewable from the front surface side.

5. A mesh as set forth in claim 4, wherein the entire mesh is first covered with a white paint and subsequently the rear surface side is coated with said dark paint and the front surface side is provided with said characters, pictures or designs.

6. A mesh comprising:

a flexible, lightweight fabric mesh having a front surface side and an opposite rear surface side, wherein the width of the fabric mesh is in the range of 0.5 to 4.0 millimeters, and wherein holes defined by open spaces between the mesh are in the range of 0.5 to 4.0 millimeters square, said mesh being coated on said rear surface side with a dark paint and being provided on said front surface side with indicia, whereby objects on the front surface side may be viewed from the rear surface side while objects on the rear surface side are substantially not viewable from the front surface side.

7. A mesh as set forth in claim 6, wherein the front surface side and rear surface side of the mesh include a base layer of white paint, the dark paint on the rear surface side being placed over the white paint and wherein the front surface side is provided with said indicia.

8. A mesh as set forth in claim 6, wherein the dark paint applied on the rear surface side of the mesh forms a part of the rear surface.

* * * * *